United States Patent Office 2,846,414
Patented Aug. 5, 1958

2,846,414

RESIN COMPOSITION AND PROCESS OF PREPARING THE SAME

Alfred F. Schmutzler, East Orange, N. J., assignor to American Cyanamid Company, New York, N. Y., a corporation of Maine No Drawing. Application April 11, 1956
Serial No. 577,441

20 Claims. (Cl. 260—70)

This invention relates to novel resinous compositions and to the process of preparing the same. Still further, this invention relates to a resinous material comprising the reaction product of dicyandiamide, an aliphatic hydroxy nitrile, an aldehyde, and a polyhydric aliphatic alcohol and to the process of preparing the same.

One of the objects of the present invention is to produce a novel, resinous material, particularly one produced by reacting dicyandiamide, an aliphatic hydroxy nitrile, an aldehyde and a polyhydric aliphatic alcohol. A further object of the present invention is to produce a new synthetic resinous material which will have utility generally in the coating resins field and will have particular use in the field of printing inks, such as steam setting printing inks and the like. These and other objects of the present invention will be discussed more fully hereinbelow.

In the preparation of the resinous materials of the present invention, one utilizes an aliphatic hydroxy nitrile. Amongst the nitriles which may be used in the practice of the process of the present invention are glycolonitrile, lactonitrile, acetone cyanhydrin or the tertiary alkoxy acylnitriles such as tertiary alkoxy acetonitriles, e. g., tertiary butoxy acetonitrile, and the like. Whenever available and desirable, these nitriles may be used either singly or in combination with one another.

Amongst the aldehydes which may be used in the practice of the process of the present invention are acetaldehyde, heptaldehyde, benzaldehyde, furfural but preferably formaldehyde or materials engendering formaldehyde such as trioxane, paraformaldehyde, hexamethylene tetramine and the like.

Among the polyhydric aliphatic alcohols which may be used in the practice of the process of the present invention are ethylene glycol, diethylene glycol, propylene glycol, dipropylene glycol, glycerol, trimethylol propane, trimethylol ethane, sorbitol, pinacol, arabitol, adonitol, pentaerythritol, dipentaerythritol and the like. These polyhydric alcohols may be used either singly or in combination with one another.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with stirrer, there is introduced 500 parts of lactonitrile, 500 parts of dicyandiamide, 500 parts of paraformaldehyde, and 400 parts of propylene glycol. This charge is mixed thoroughly and is then placed on mixing rollers. The mixing is continued for about 16 hours, whereupon there is added about 3 parts of guanidine carbonate. The mixing is continued at room temperature for several days to produce a clear resin. When 40 parts of this basic resin thus produced are diluted with 20 parts of propylene glycol, 3 parts of urea are added and the charge is mixed on mixing rollers for 24 hours, the resultant resin had a viscosity of Y on the Gardner-Holdt scale at 25° C. Another solution of the same resin, but containing 3 parts of dicyandiamide in place of the urea, had a viscosity of Z (Gardner-Holdt). A further solution of the basic resin containing 3 parts of melamine instead of the urea had a viscosity of $Z_1$–$Z_2$ (Gardner-Holdt). A still further solution containing 1 part of guanidine carbonate in place of the 3 parts of urea had a viscosity of $Z_1$–$Z_2$ on the Gardner-Holdt scale.

*Example 2*

A printing ink is prepared using 40 parts of the basic resin prepared according to Example 1, 30 parts of benzidine yellow and 30 parts of P–1 ink oil (a high boiling aliphatic hydrocarbon solvent of low kauri-butanol value). These ingredients are thoroughly blended in a conventional manner. Prints made from this ink dried very rapidly and were glossy.

*Example 3*

Into a suitable reaction vessel equipped with thermometer, stirrer and reflux condenser, there is introduced 710 parts of lactonitrile, 840 parts of dicyandiamide, 660 parts of paraformaldehyde, 660 parts of propylene glycol and 9 parts of guanidine carbonate. The charge is thoroughly mixed and then heated gradually to about 70–75° C. and held at 75–78° C. for about 2 hours. The charge is then gradually heated to about 100° C., whereupon it is cooled to about room temperature. The resultant resinous solution, containing 65.8% solids, was water soluble. A thin film of an aqueous solution baked at an elevated temperature becomes water-insoluble.

*Example 4*

Into a suitable reaction vessel equipped as in Example 3, there is introduced 710 parts of lactonitrile, 1680 parts of dicyandiamide, 1320 parts of paraformaldehyde, 1080 parts of propylene glycol and 17 parts of guanidine carbonate. The charge is heated gradually to about 70–75° C. and then is gradually heated to about 96–103° C. When slight darkening starts to occur due to the high temperature, the charge is cooled to about 75–80° C. and heating continued until a viscous syrup is produced.

*Example 5*

Into a suitable reaction vessel equipped as in Example 3, there is introduced 291 parts of propylene glycol and 119 parts of lactonitrile. These are thoroughly stirred and there is added 243 parts of an aqueous formalin solution followed by 10 parts of 29% ammonia and finally 561 parts of dicyandiamide. With thorough stirring, the charge is heated gradually to 60° C., whereupon 229 parts of flake paraformaldehyde is added followed by 100 parts of hexane. The charge is heated gradually to about 100° C., in order to boil off the water by azeotropic distillation. After the azeotropic distillation of the water, the system is sparged with nitrogen gas to boil off hexane. The resultant product is diluted 2:1 with propylene glycol. The resulting solution contained 52.8% non-volatile matter, according to solids determination, and a viscosity of X–Y on the Gardner-Holdt scale.

*Example 6*

Into a suitable reaction vessel equipped with thermometer and stirrer, there is introduced 106 parts of lactonitrile, 1.3 parts guanidine carbonate and 180 parts of propylene glycol. These components are mixed and heated gradually to about 42° C., whereupon there is added 252 parts of dicyandiamide and the charge is then heated to 80–85° C., whereupon heating is stopped and 149 parts of flake paraformaldehyde are added. The charge is allowed to cool to about 45° C., and then heating is continued. The resultant product is water soluble and is convertible on the application of heat to a water insoluble film.

In addition to their use in coating resins and particularly printing inks, the synthetic resins of the present invention may be used as adhesives, laminating compositions, molding compositions, in the treatment of textiles, paper, leather and a variety of other uses.

The process of the present invention may be carried out at a temperature between about room temperature, namely about 25–30° C., and the boiling point of the reaction mixture although the use of the extreme limits of this temperature range will have certain short-comings. For instance, the use of room temperatures will result in a prolongation of the time required to effect complete reaction. The use of the upper limit of the temperature range may tend to cause some darkening of the product, which would be disadvantageous if a light colored resin is desired. This upper limit is of no consequence, however, where the ultimate product is to be used in a black printing ink or other dark colored printing ink. For most practical purposes, the reaction may be carried out at a temperature between 45° C. and 85° C. Above 90° C., the reaction proceeds very fast and controlling it might be difficult, although if good cooling is available, temperatures up to 100° C. are useful. Above 110° C., the reaction becomes uncontrollable if not sufficiently diluted.

For ease in handling, it may sometimes be desired to utilize a solvent medium in which to carry out the reaction. One may use such solvents as water, the lower aliphatic monohydric alcohols such as methanol, ethanol, propanol, butanol, amyl alcohol and the like; hydrocarbon solvents, such as hexane, heptane, benzene, toluene, xylol or the mineral spirits solvents such as Varsol No. 1, Varsol No. 2, P–1 ink oil and the like. If it is desired, one may carry out the reaction in the absence of a solvent and upon completion thereof cut the resultant resinous material with the selected solvent, which solvent may, if desired, be a solvent of the same class as the aliphatic polyhydric alcohols used in the reaction.

In order to accelerate the reaction, it is often desired to utilize a catalytic material, preferably an alkaline catalyst. Guanidine carbonate will be found to be particularly useful in this connection. However, other alkaline materials may be used such as sodium hydroxide, lithium hydroxide, potassium hydroxide, calcium hydroxide, ammonium hydroxide, guanidine, guanylurea, 1° amines, 2° amines, 3° amines, quaternary amines, hydroxy amines, alkaline salts of above, such as ammonium carbonate, amine carbonate, and the like.

In the preparation of coating compositions and printing inks, any of the conventional pigments and/or dyes may be utilized to impart the desired coloration to the resinous composition. Illustrative of coloring materials are direct dyes, such as malachite green base, auramine yellow base, chrysoidine base, rhodamine B base, Victoria blue base, trimethyl violet base, and the like, and pigments such as phthalocyanine blue, phthalocyanine green, toners and lakes of direct dyes, lithol red, toluidine red, iron blue, chrome yellow, chrome orange, molybdenum orange, cadmium reds, irons reds, benzidine yellow, and the like.

In preparing the compositions of the present invention, the ratio of aldehyde to dicyandiamide may be varied between about 0.8:1 and 3.0:1, aldehyde to dicyandiamide, respectively. Preferably, the mol ratios would be 1.25:1 to 1.8:1, aldehyde to dicyandiamide, resspectively.

The mol ratio of the aliphatic hydroxy nitrile to the dicyandiamide may be varied over a range of 0.2:1 to 2:1, aliphatic hydroxy nitrile to dicyandiamide, respectively. The preferred mol ratio is 1:1.

In the preparation of the resins of the present invention, the mol ratio of dicyandiamide to polyhydric alcohol may be varied between about 1:0.5 and 1:4, dicyandiamide to polyhydric alcohol, respectively. Preferably, one would use 1 mol of dicyandiamide for each 2 mols of polyhydric alcohol. In many respects, the amount of polyhydric alcohol used is calibrated to the mol ratio of the dicyandiamide to formaldehyde. When this latter mol ratio is 1:2, respectively, the amount of polyhydric alcohol used should approximate about 1:2, dicyandiamide to polyhdric alcohol, respectively. When the mol ratio of dicyandiamide to formaldehyde is about 1:1, the amount of polyhydric alcohol should approximate the upper limit, namely 1:4, dicyandiamide to polyhydric alcohol, respectively. When the dicyandiamide to formaldehyde ratio is about 1:3, the dicyandiamide to polyhydric alcohol ratio should approximate the lower limit, namely 1:0.5, dicyandiamide to polyhydric alcohol, respectively. When the minimum of polyhydric alcohol is used, it is generally desirable to retain water in the reaction mixture. The water is usually introduced with the formalin or the paraformaldehyde. The water in this instance serves as a diluent.

I claim:

1. A process for the preparation of a resinous material comprising reacting (1) dicyandiamide, (2) an aliphatic hydroxy nitrile, (3) an aldehyde and (4) a polyhydric aliphatic alcohol.

2. A process for the preparation of a resinous material comprising heat reacting (1) dicyandiamide, (2) an aliphatic hydroxy nitrile, (3) an aldehyde and (4) a polyhydric aliphatic alcohol.

3. A process for the preparation of a resinous material comprising heat reacting (1) dicyandiamide, (2) lactonitrile, (3) an aldehyde and (4) a polyhdric aliphatic alcohol.

4. A process for the preparation of a resinous material comprising heat reacting (1) dicyandiamide, (2) glycolonitrile, (3) an aldehyde and (4) a polyhydric aliphatic alcohol.

5. A process for the preparation of a resinous material comprising heat reacting (1) dicyandiamide, (2) acetone cyanhydrin, (3) an aldehyde and (4) a polyhydric aliphatic alcohol.

6. A process for the preparation of a resinous material comprising heat reacting (1) dicyandiamide, (2) lactonitrile, (3) formaldehyde and (4) a polyhydric aliphatic alcohol.

7. A process for the preparation of a resinous material comprising heat reacting (1) dicyandiamide, (2) glycolonitrile, (3) formaldehyde and (4) a polyhydric aliphatic alcohol.

8. A process for the preparation of a resinous material comprising heat reacting (1) dicyandiamide, (2) acetone cyanhydrin, (3) formaldehyde and (4) a polyhydric aliphatic alcohol.

9. A process for the preparation of a resinous material comprising heat reacting (1) dicyandiamide, (2) lactonitrile, (3) formaledhyde and (4) propylene glycol.

10. A process for the preparation of a resinous material comprising heat reacting (1) dicyandiamide, (2) glycolonitrile, (3) formaldehyde and (4) propylene glycol.

11. A process for the preparation of a resinous material comprising heat reacting (1) dicyandiamide, (2) acetone cyanhydrin, (3) formaldehyde and (4) propylene glycol.

12. The resinous reaction product of (1) dicyandiamide, (2) an aliphatic hydroxy nitrile, (3) an aldehyde and (4) a polyhydric aliphatic alcohol.

13. The resinous reaction product of (1) dicyandiamide, (2) lactonitrile, (3) an aldehyde and (4) a polyhydric aliphatic alcohol.

14. The resinous reaction product of (1) dicyandiamide, (2) glycolonitrile, (3) an aldeyhde and (4) a polyhydric aliphatic alcohol.

15. The resinous reaction product of (1) dicyandiamide, (2) acetone cyanhydrin, (3) an aldehyde and (4) a polyhydric aliphatic alcohol.

16. The resinous reaction product of (1) dicyandiamide, (2) lactonitrile, (3) formaldehyde, and (4) a polyhdric aliphatic alcohol.

17. The resinous reaction product of (1) dicyandiamide, (2) glycolonitrile, (3) formaldehyde and (4) a polyhydric aliphatic alcohol.

18. The resinous reaction product of (1) dicyandiamide, (2) acetone cyanhydrin, (3) formaldehyde, and (4) a polyhydric aliphatic alcohol.

19. The resinous reaction product of (1) dicyandiamide, (2) lactonitrile, (3) formaldehyde, and (4) propylene glycol.

20. The resinous reaction product of (1) dicyandiamide, (2) glycolonitrile, (3) formaledhyde and (4) propylene glycol.

References Cited in the file of this patent

UNITED STATES PATENTS

| | | |
|---|---|---|
| 2,606,885 | Schutzler | Aug. 12, 1952 |
| 2,606,904 | Kaiser | Aug. 12, 1952 |